Jan. 22, 1957    P. J. HUEBSHMAN    2,778,672
PAYLOAD RAISING DEVICE FOR VEHICLES FOR HAULING AUTOMOBILES
Filed Feb. 12, 1951    2 Sheets-Sheet 1
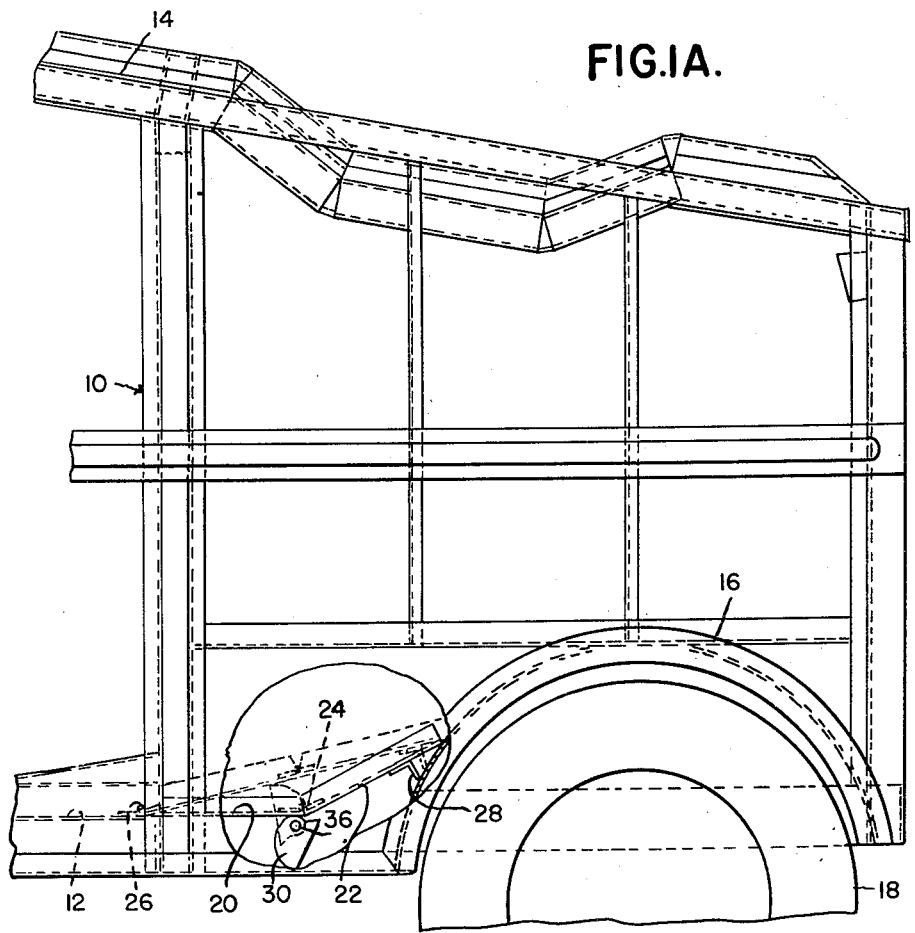
FIG.IA.
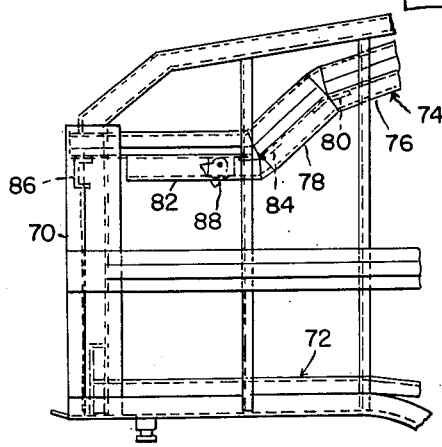
FIG.IB.
INVENTOR.
PAUL J. HUEBSHMAN
BY *Whittemore,*
*Hulbert & Belknap*
ATTORNEYS

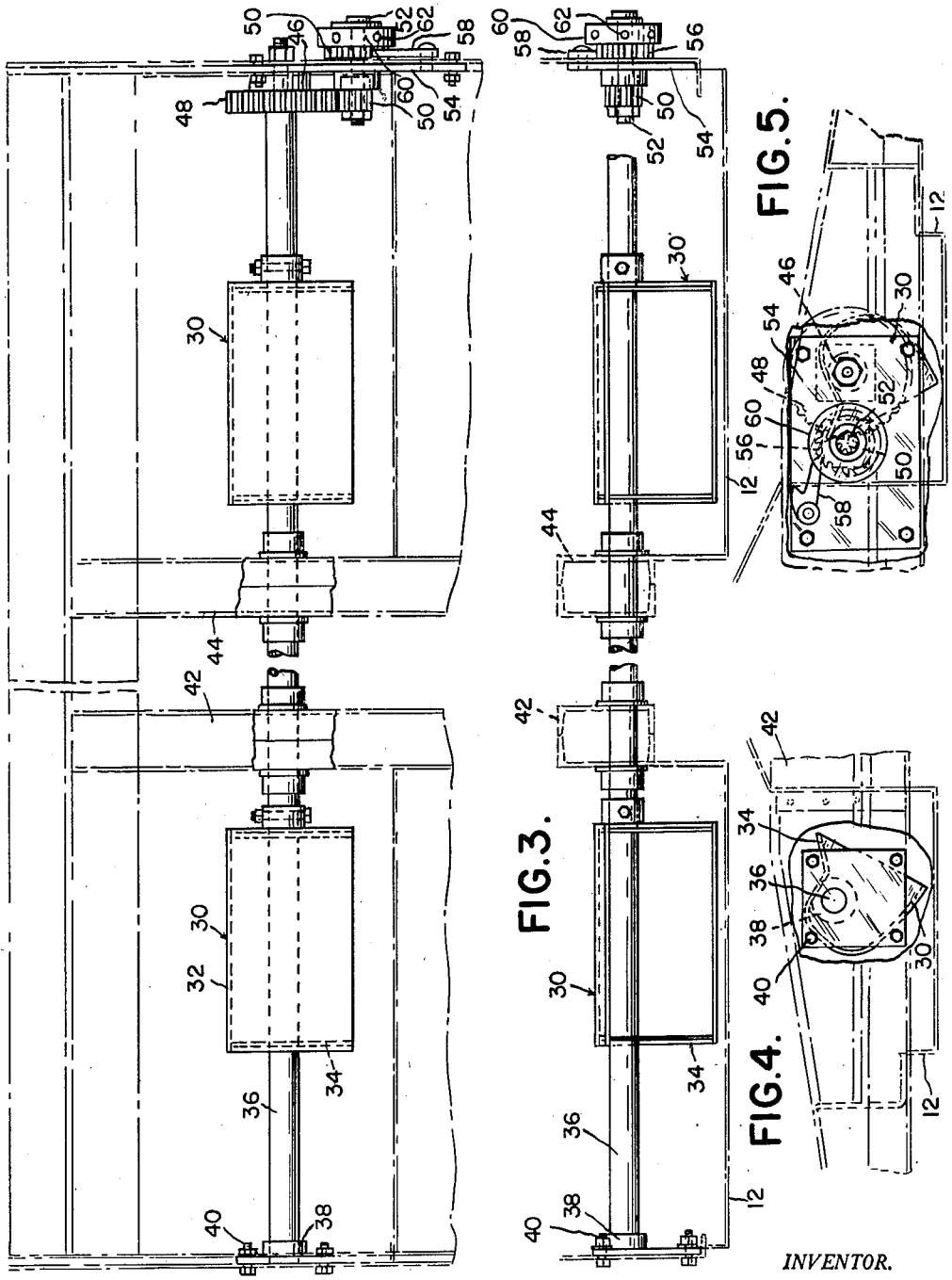

United States Patent Office 2,778,672
Patented Jan. 22, 1957

2,778,672

PAYLOAD RAISING DEVICE FOR VEHICLES FOR HAULING AUTOMOBILES

Paul J. Huebshman, Dearborn, Mich., assignor to Whitehead & Kales Company, River Rouge, Mich., a corporation of Michigan Application February 12, 1951, Serial No. 210,523

6 Claims. (Cl. 296—1)

The present invention relates to a payload raising device for vehicles for a hauling automobiles.

At the present time a substantial proportion of new automobiles are shipped from assembly points by way of haulaway vehicles, ordinarily in the form of semi-trailers. In order for this operation to be economical it is essential to transport as many automobiles in a single load as possible. At the same time the overall dimensions of haulaway vehicles used on the highways are rigidly controlled by the several states. Accordingly, it becomes a matter of greatest importance to conserve space in the stowage of automobiles on a haulaway vehicle.

In the haulaway trailers most widely used at the present time the trailer is provided with upper and lower trackways and the automobiles are ordinarily moved onto and off the trackways under their own power. To keep the overall height of the loaded vehicle as low as possible the lower trackways are placed as close to the ground as possible and this results in the lower trackways being substantially below the tops of the wheels of the haulaway trailer. Accordingly, the lower trackways include upwardly convex fender portions overlying the wheels of the vehicle and over which the wheels of the automobiles must pass in loading or unloading. The level of the lower trackway is sufficiently below the tops of these wheel fenders as to cause the fenders to be serious obstructions to passage of automobiles thereover. In accordance with the present invention means are provided extending from the lower trackway to an upper portion of the wheel fenders and constituting an inclined ramp permitting automobiles to be driven over the wheel fenders. However, these ramps necessarily elevate the wheels of the automobiles as they approach the ramp. In order to conserve the utmost in storage space it is desirable for the ramp to be lowered to the level of the trackway when the vehicle is in transit, thus permitting lowering of a pair of wheels of an automobile of the load to the trackway directly adjacent to the wheel fenders of the haulaway trailer. The means are in the form of short track sections provided with cam or other suitable mechanism for raising and lowering and this mechanism is designed to effect simultaneous raising and lowering of the track sections at opposite sides of the vehicle. The mechanism further includes force multiplying devices so that the operator of the vehicle may raise the track sections while a pair of wheels of an automobile in transit rest thereon.

While reference is made to wheel fenders as track obstructions, it is recognized that other types of obstructions may exist, or the tracks themselves may have abrutly inclined portions provided to clear vehicles on lower tracks and at the same time conserve the maximum space.

With the foregoing general remarks in mind it is an object of the present invention to provide a payload raising device for raising and lowering the wheels of an automobile in transit on a haulaway vehicle.

It is a further object of the present invention to provide adjustable track sections designed to operate as inclined ramps leading from a depressed portion of a trackway of the vehicle to an elevated portion thereof.

It is a further object of the present invention to provide movable track sections designed to move between a first position in which they occupy the plane of the trackway, and a second elevated position in which they serve as an inclined ramp leading from the trackway to an elevated portion of an upwardly convex wheel fender or other elevated track portion.

It is a further object of the present invention to provide structure of the character described in association with cam means for raising and lowering the track sections at opposite sides of the vehicle.

It is a further object of the present invention to provide gearing permitting the operator to raise both track sections simultaneously while supporting a pair of wheels of an automobile in transit.

Other objects and features of the invention will become apparent as the description proceeds, especially when taken in conjunction with the accompanying drawings, wherein:

Figure 1A is a fragmentary side elevation of the rear end of a trailer, with parts broken away, illustrating the payload raising device.

Figure 1B is a fragmentary side elevation of the forward end of a trailer, with parts broken away illustrating a payload raising device in another location.

Figure 2 is a plan view of the cams and the camming operating mechanism.

Figure 3 is an elevational view of the cams and cam operating mechanism.

Figure 4 is an end elevation of the left hand end of the structure shown in Figure 3.

Figure 5 is an end elevation of the right hand end of the structure shown in Figure 3.

Referring now to Figure 1A there is illustrated a portion of a haulaway vehicle. In the present instance the vehicle is a semi-trailer and the portion of the vehicle illustrated is the rear end thereof. The vehicle comprises a supporting frame indicated generally at 10, a lower runway or trackway 12, and an upper runway or trackway 14. As is conventional in such trailers, the rear portion of the upper trackway may be moved to an elevated position to permit an automobile to be driven onto the lower trackway 12.

In order to conserve height the lower trackway 12 is located as close to the ground as possible and accordingly, the principal horizontal section thereof lies substantially below the upper portion of an upwardly convex wheel housing or fender 16 which overlies the rear wheel 18 of the haulaway vehicle. It will be understood that after the lower track has been filled with automobiles, the rear portion of the upper track is lowered into the position shown in the figure and automobiles are driven or otherwise moved onto the upper trackway.

In transit the rearmost automobile on the lower trackway has a pair of wheels located just forward of the wheel fenders 16. Reference to Figure 1A will illustrate that if no means were provided between the trackway 12 and the wheel fender 16, the fender would present a serious obstacle to movement of the automobile rearwardly off of the vehicle.

In accordance with the present invention bridging means are provided to extend from the lower trackway 12 to an upper portion of the wheel fender 16. As illustrated this means comprises a pair of track sections 20 and 22 hinged together as indicated at 24. The forward end of the track section 20 is hinged to the trackway 12 as indicated at 26. The rear end of the track section 22 is slidable on the upwardly convex surface of the wheel fender 16. In order to assist in supporting the load the track sections 22 are preferably provided with transversely extending angle pieces providing legs 28 so that the track sections 22 engage the upwardly convex wheel fenders 16 at their ends and at the lower edges of the angle pieces 28.

The track sections 20 and 22 are movable between the full line lower transport position shown in which the track sections are angularly related and the track section 20 occupies substantially the same horizontal plane as the trackway 12, and an upper unloading position illustrated in dotted lines in which track sections 20 and 22 are moved into alignment and form an inclined ramp over which the wheels of automobiles carried on the lower trackway 12 may move. In use, a pair of automobile wheels remain supported on the track section 20 and by moving the track section to the lower full line position illustrated, that end of the automobile may be lowered by a few inches. This saving in space, while intrinsically small, in many cases is all that is required to permit a load of automobiles to be stowed within dimentional requirements set up by the several States.

In order to raise and lower the track sections 20 and 22 between the position shown in Figure 1 while the wheels of an automobile remain thereon, cam means including cams indicated generally at 30 are employed.

Referring now to Figures 2-5 the cam means and the cam operating mechanism is illustrated in detail. The cams 30 have the eccentric configuration best seen in Figures 4 and 5 and include an outer cam shell 32 and end plates 34. Cams 30 are keyed or otherwise secured against rotation to a transversely operating shaft 36 which has one end journaled in a bearing 38 bolted to the frame of the trailer as indicated at 40. The shaft 36 extends through longitudinally extending frame members 42 and 44 and at its opposite end is mounted in a bearing 46. A relatively large drive gear 48 is keyed or otherwise secured to the shaft 36 and has associated therewith a driving pinion 50 mounted on a stub shaft 52 which extends through a mounting plate 54 bolted or otherwise rigidly secured to the frame of the vehicle. The shaft 52 carries at the opposite side of the plate a ratchet 56 having a pawl 58 associated therewith, and a disc 60 provided with a plurality of openings 62.

The operator of the vehicle engages a suitable tool in one or more of the openings 62 of the disc 60 and rotates pinion 50 thereby. The relative sizes of the pinion 50 and the gear 48 give a substantial mechanical advantage which permits the operator to rotate the cams 30 in a direction to elevate the track sections 20 and 22, even though the wheels of an automobile in transit rest thereon. Moreover, the pawl 58 engages teeth of the ratchet 56 to retain the cams elevated as required.

In use, automobiles in transit may be driven over the wheel fenders 16 onto the track sections 20 and 22 with the track sections in elevated position. Alternatively, at this time the track sections may be in the lower full line position shown in Figure 1A. In transit the wheels of the rear automobile on the lower trackway remain upon track sections 20 and/or 22. If the track sections 20 and 22 were in elevated position when the automobile was driven thereon, the track sections are then lowered to the full line position for transit, thus moving the corresponding end of the automobile downwardly by an amount indicated in Figure 1A. In order to drive the automobiles on the lower trackway off of the vehicle, track sections 20 and 22 are elevated to the dotted line position by appropriate rotation of the cams 30. Due to the provision of the pinion 50 and gear 48, and the mechanical advantage obtained by employing a tool in the form of a lever associated with the disc 60, the track sections together with the automobile partly supported thereby, may be elevated until the track sections reach the dotted line position as seen in Figure 1A. The track sections thus are brought into a position in which they constitute a gradual inclined ramp leading from the lower trackway 12 to an upper portion of the upwardly convex wheel fender 16. This permits automobiles to be driven off the vehicle over the wheel fenders 16 without difficulty.

Referring now to Figure 1B there is shown a fragmentary side elevational view of the forward end of the trailer illustrating another point at which the present invention may advantageously be applied. In this figure the forward end of the trailer includes frame portions illustrated generally at 70 including a lower track 72 and an upper track indicated generally at 74. The upper track 74 includes a fixed portion 76. Forwardly of the fixed portion 76 is a track portion 78 pivoted to the forward end of the track portion 76 by hinge means indicated at 80. The track also includes a third portion 82 pivoted to the forward end of the portion 78 by hinge means indicated at 84. The forward end of the track section 82 rests upon a transverse frame element 86 and is slidably associated therewith.

A payload lifting cam device is provided which extends transversely across the trailer and includes cams 88 engaging under track sections 82 adjacent the ends thereof which are pivoted to track sections 78. The cams 88 may be identical with the cams 30 previously described and are provided with rotating means which may be identical with that described in connection with the cams 30.

The track sections 78 and 80 in traveling position occupy the full line position shown in Figure 1B. This permits wheels of an automobile being transported by the vehicle to rest upon the track sections 82 and thus to be in a relatively lowered or depressed condition. In many cases location of the wheels of an automobile on such a depressed track portion permits compliance with overall height requirements which could not otherwise be obtained. However, the stationary track section 74 must be in the elevated position shown in order to clear portions of an automobile supported in transit on the lower track section 72. With the track sections 78 and 82 in the full line position shown in Figure 1B it will be appreciated that the relatively abrupt inclination of the track section 78 makes it extremely difficult if not impossible to drive an automobile off the upper tracks of the trailer. However, by employing the present invention the track sections 78 and 82 may be moved upwardly to provide together a smooth continuous ramp of gradual inclination so that the automobile may be driven off of the upper trackway without difficulty.

While there has been illustrated and described two locations for the payload lifting device, it will be appreciated that other locations may be encountered in vehicles of the character described due either to the desirable configuration of the trackways or the presence of obstructions therein, and that accordingly the two illustrated locations of the payload lifting devices are merely by way of example and not intended to preclude the use of the devices at other points where required.

In the foregoing specifically described embodiments of the present invention it will be observed that in general the parts include a stationary track section or portion, a movable track section or portion adapted to be raised and lowered in a vertical plane, and a connecting track section or portion. The connecting track section or portion, when the movable portion is in raised position, constitutes a gradually inclined ramp over which an automobile may be driven.

The drawings and the foregoing specification constitute a description of the improved payload raising device for vehicles for hauling automobiles in such full, clear, concise and exact terms as to enable any person skilled in the art to practice the invention, the scope of which is indicated by the appended claims.

What I claim as my invention is:

1. In an automobile haulaway vehicle having tracks for receiving automobiles for transport and over which automobiles are driven in loading and unloading, upwardly convex fenders in alignment with said tracks overlying wheels of the vehicle, said fenders extending substantially above said tracks and constituting obstacles to movement of automobiles along said tracks, a pair of adjustable track means movable between an upper position in which they constitute inclined ramps between said tracks and said fenders and a lower position in which they support wheels of the automobile substantially in the plane of said tracks and directly adjacent said fenders, each of said track means comprising a first track section pivoted to one of said tracks at a point spaced from the adjacent fender and having a free end portion extending toward said fender, and a second track section hinged at one end to the free end of said first track section and having its other end slidable on said fender, and means underlying said track sections for raising and lowering said track sections.

2. Structure as defined in claim 1 in which said means comprises cam means positioned to engage the underside of said first track sections adjacent the free end thereof.

3. Structure as defined in claim 2 comprising in addition a cam shaft operatively secured to both of said cam means.

4. Structure as defined in claim 3 comprising in addition operating means for said shaft including effort multiplying gearing providing for raising of said track sections when wheels of an automobile are supported thereon.

5. Structure as defined in claim 4 comprising in addition pawl and ratchet mechanism connected to said shaft to lock said cams in position to hold said track sections in raised position.

6. Structure as defined in claim 1, said second track sections having supporting legs spaced from the free ends thereof positioned to engage the upper surfaces of said fenders when said track means are in raised position.

References Cited in the file of this patent
UNITED STATES PATENTS

| | | |
|---|---|---|
| 2,385,115 | Stuart | Sept. 18, 1945 |
| 2,451,284 | Garnett | Oct. 12, 1948 |
| 2,473,830 | Stuart | June 21, 1949 |
| 2,611,640 | Francis | Sept. 23, 1952 |